US012801100B2

(12) United States Patent
Han

(10) Patent No.: US 12,801,100 B2
(45) Date of Patent: Nov. 17, 2026

(54) METHOD FOR CONSTRUCTING DIGITAL TWIN BY COMBINING REDUCED ORDER MODELS, MEASUREMENT DATA, AND MACHINE LEARNING TECHNIQUES FOR MULTIPHYSICAL ENGINEERING SYSTEM

(71) Applicant: SANG SHIN CORP., Seoul (KR)

(72) Inventor: Woo Joo Han, Yongin-si (KR)

(73) Assignee: SANG SHIN CORP., Seoul (KR)

( * ) Notice: Subject to any disclaimer, the term of this patent is extended or adjusted under 35 U.S.C. 154(b) by 817 days.

(21) Appl. No.: 18/269,349

(22) PCT Filed: Dec. 24, 2021

(86) PCT No.: PCT/KR2021/019870
§ 371 (c)(1),
(2) Date: Jun. 23, 2023

(87) PCT Pub. No.: WO2022/139557
PCT Pub. Date: Jun. 30, 2022

(65) Prior Publication Data

US 2024/0061385 A1 Feb. 22, 2024

(30) Foreign Application Priority Data

Dec. 24, 2020 (KR) ........................ 10-2020-0183255

(51) Int. Cl.
*G05B 13/04* (2006.01)
*G05B 13/02* (2006.01)

(52) U.S. Cl.
CPC ....... *G05B 13/048* (2013.01); *G05B 13/0265* (2013.01)

(58) Field of Classification Search
None
See application file for complete search history.

(56) References Cited

U.S. PATENT DOCUMENTS 11,433,977 B2 * 9/2022 Knezevic ................ B63B 71/10
11,727,162 B2 * 8/2023 Knezevic ................ G06F 30/10 703/1

(Continued)

FOREIGN PATENT DOCUMENTS

CN 110442737 A 11/2019
CN 111230887 A 6/2020

(Continued)

OTHER PUBLICATIONS

International search report of PCT/KR2021/019870, Mar. 28, 2022, English translation.

(Continued)

*Primary Examiner* — Michael Fuelling
(74) *Attorney, Agent, or Firm* — STIP Law Group, LLC

(57) ABSTRACT

The purpose of the present invention is to provide a method for constructing a digital twin, enabling real-time monitoring, operation improvement, and coping with the occurrence of an accident in an industrial site by combining reduced order models of a multiphysical system, measurement data and artificial intelligence techniques, and the method for constructing a digital twin, according to the present invention, comprises: a network-defining step of defining a multiphysical engineering system as a network constituted by a combination of element facilities; an element model establishing step of establishing a relation-based 0-dimensional (0-D) model for each of the element facilities; a system model establishing step of closing all relations for a system by reflecting an additional relation by machine learning from a 3-dimensional computer aided engineering reduced order model (3-D CAE ROM) or data for key element facilities in the 0-D models established in the element model establishing step; a system ROM constructing step of constructing a system ROM for the system model established in the system model establishing step from calculation results for condi- (Continued)

tions sampled in an operating variable parameter space; a system ROM correcting step of minimizing an error between a model predicted value and measured data for the element facility and the system; and a real-time algorithm constructing step of constructing an algorithm for identifying an expected system state or an optimal operating condition in a virtual operating condition based on the real-time monitoring result.

7 Claims, 8 Drawing Sheets

(56) References Cited

U.S. PATENT DOCUMENTS

| | | | | |
|---|---|---|---|---|
| 12,326,717 | B2 * | 6/2025 | Knezevic | G06F 30/13 |
| 2017/0300605 | A1 * | 10/2017 | Ardis | G05B 23/024 |
| 2019/0080259 | A1 * | 3/2019 | Wang | G06N 20/00 |
| 2022/0100916 | A1 * | 3/2022 | Knezevic | G06F 30/10 |
| 2024/0185028 | A1 * | 6/2024 | Liu | G06N 3/088 |
| 2024/0310795 | A1 * | 9/2024 | Nabi | G05B 13/027 |
| 2025/0371225 | A1 * | 12/2025 | Lesnik | G06F 30/27 |

FOREIGN PATENT DOCUMENTS

| | | | |
|---|---|---|---|
| KR | 102048243 | B1 | 11/2019 |
| KR | 20200081066 | A | 7/2020 |
| KR | 102261942 | B1 | 6/2021 |
| WO | WO2020246662 | A1 | 12/2020 |

OTHER PUBLICATIONS

Michael G. Kapteyn et al, Toward predictive digital twins via component-based reduced-order models and interpretable machine learning, 2020 AIAA Scitech Forum & Exhibition, Apr. 2020, AIAA, Orlando, USA; Sections II-III; figures 2-3.

Oleksiy Bondarenko et al, Development of a diesel engine's digital twin for predicting propulsion system dynamics, Energy, 2020, vol. 196, Issue 117126, Elsevier Ltd, Amsterdam, Netherlands.

* cited by examiner

METHOD FOR CONSTRUCTING DIGITAL TWIN BY COMBINING REDUCED ORDER MODELS, MEASUREMENT DATA, AND MACHINE LEARNING TECHNIQUES FOR MULTIPHYSICAL ENGINEERING SYSTEM

CROSS-REFERENCE TO RELATED APPLICATIONS

This application is the U.S. National Phase under 35 U.S.C. § 371 of International Application No. PCT/KR2021/019870, filed on Dec. 24, 2021, which in turn claims the benefit of Korean Application No. 10-2020-0183255, filed on Dec. 24, 2020, the disclosures of which are incorporated by reference into the present application.

TECHNICAL FIELD

The present invention relates to a method for constructing a digital twin, and particularly, to a method for constructing a digital twin by combining 0-dimensional (hereinafter referred to as "0-D") or multi-dimensional (1-D, 2-D, or 3-D) reduced order models (hereinafter referred to as "ROMs"), field data based on the Internet of Things (hereinafter referred to as "IoT"), and artificial intelligence techniques for a multiphysical engineering system.

BACKGROUND ART

A digital twin is a twin model constructed in virtual space for a system composed of multi-physics facilities or multi-element facilities existing in a real space, and given all the conditions that determine an operating state, the digital twin should be able to determine the operating state and variables of interest, as in the real world.

Therefore, the digital twin should be able to accurately identify all variables of interest under current operating conditions (diagnosis mode), and predict all variables of interest under a virtual operating condition (prediction mode). In addition, the time required for such diagnosis and prediction should be short enough to provide real-time information to field operators.

"Patent Document 1" below discloses a method for constructing a reduced order model in which field measurement data and computer-aided engineering (CAE) analysis are combined through coupled-proper orthogonal decomposition (coupled-POD), but the method is limited to the technology of combining a 3-dimensional distribution given as the result of the measurement data and CAE analysis, and therefore it has a limitation that it is difficult to expand its application to a multiphysical system configured as a network of a plurality of element facilities.

(Patent Document 1) KR 10-2048243 B1 (Nov. 25, 2019)

DISCLOSURE

Technical Problem

An object of the present invention is to provide a method for constructing a digital twin capable of real-time monitoring, operation improvement, and response to accidents by combining a reduced order model (ROM) based on the simulation of a multiphysical engineering system, field data, and machine learning techniques.

Technical Solution

According to an embodiment of the present invention, a method for constructing a digital twin includes: a network-defining step of defining a multiphysical engineering system as a network constituted by a combination of element facilities; an element model establishing step of establishing a relation-based 0-D model for each of the element facilities; a system model establishing step of closing all relations for a system by reflecting an additional relation by machine learning from a 3-D CAE ROM or data for key element facilities in the 0-D models established in the element model establishing step; a system ROM constructing step of constructing a system ROM for the system model established in the system model establishing step from calculation results for conditions sampled in an operating variable parameter space; a system ROM correcting step of minimizing an error between a model predicted value and measured data for the element facility and the system; and a real-time algorithm constructing step of constructing an algorithm for identifying an expected system state or an optimal operating condition in a virtual operating condition based on the real-time monitoring result.

The system ROM correcting step may include any one of: a gappy-proper orthogonal decomposition (POD) correcting step of applying a gappy-POD method for driving a ROM from a matrix composed of all variables of interest obtained from conditions sampled in an operating variable parameter space and adjusting principal component coefficients of the ROM such that a sum of squared errors between a predicted value and a measured value is minimized; and an artificial intelligence correcting step of correcting the error using artificial intelligence techniques of machine learning by a neural network circuit based on accumulated data when a causal relationship or a functional relationship between an error between the predicted value and the data, an operating variable, and a predicted physical quantity is not clear.

As the gappy-POD method, the coupled gappy-POD method for adjusting principal component coefficients of the ROM by combining heterogeneous measured values may be applied.

The gappy-POD correcting step and the artificial intelligence correcting step may be performed independently of each other or sequentially and simultaneously.

In the system ROM correcting step, an appropriate weight may be assigned to each error according to the uncertainty of the measured value or the importance of main performance indicators while minimizing an error of a predicted value.

In the system ROM correcting step, to maintain the digital twin's accuracy, an automatic correction that minimizes an error between online measured data and the model predicted value may be performed periodically or when a significant change in facility operation occurs.

In the real-time algorithm constructing step, a condition for maximizing or minimizing a predefined performance variable or cost function in an operating variable parameter space may be found and presented to an operator in real time.

Advantageous Effects

A digital twin construction method, according to the present invention, has the following excellent effects.

i) From O-D simulation for each element facility, 3-D CAE simulation for key facilities, and machine learning results from data. It is possible to construct a system reduced order model (system ROM) and a digital twin based on the system ROM, capable of real-time operation with fast response characteristics.

ii) By reflecting various online and offline measurement data through a gappy-POD or coupled gappy-POD method, it is possible to construct a corrected 3-D ROM for key facilities or a corrected ROM for the entire system and maintain the reliability and accuracy of a digital twin based on the corrected 3-D ROM or the corrected ROM.

iii) By applying different weights to variables according to the uncertainty of measurement data or the importance of affecting final performance variables during data assimilation, it is possible to minimize the uncertainty.

iv) A digital twin can be utilized in two modes of diagnosis and prediction, and optimal operating conditions can be presented in real time within a permitted operating range, which can be reflected in operation automation.

DESCRIPTION OF DRAWINGS

FIG. 5 is a diagram illustrating a correction method according to a system ROM correcting step of the present invention, in which

FIG. 6 is a diagram illustrating an optimal operating case by a real-time algorithm according to a real-time algorithm constructing step of the present invention, in which

DESCRIPTION OF MAIN ELEMENTS IN DRAWINGS

S100: Network-defining step
S200: Element model establishing step
S300: System model establishing step
S400: System ROM constructing step
S500: System ROM correcting step
S510: Gappy-POD correcting step
S520: Artificial intelligence correcting step
S600: Real-time algorithm constructing step

BEST MODE

Hereinafter, the method for constructing a digital twin according to the present invention is described in detail with reference to the accompanying drawings. However, a detailed description of the well-known functions and configurations that may unnecessarily make the gist of the present invention unclear is omitted.

Figure 1:
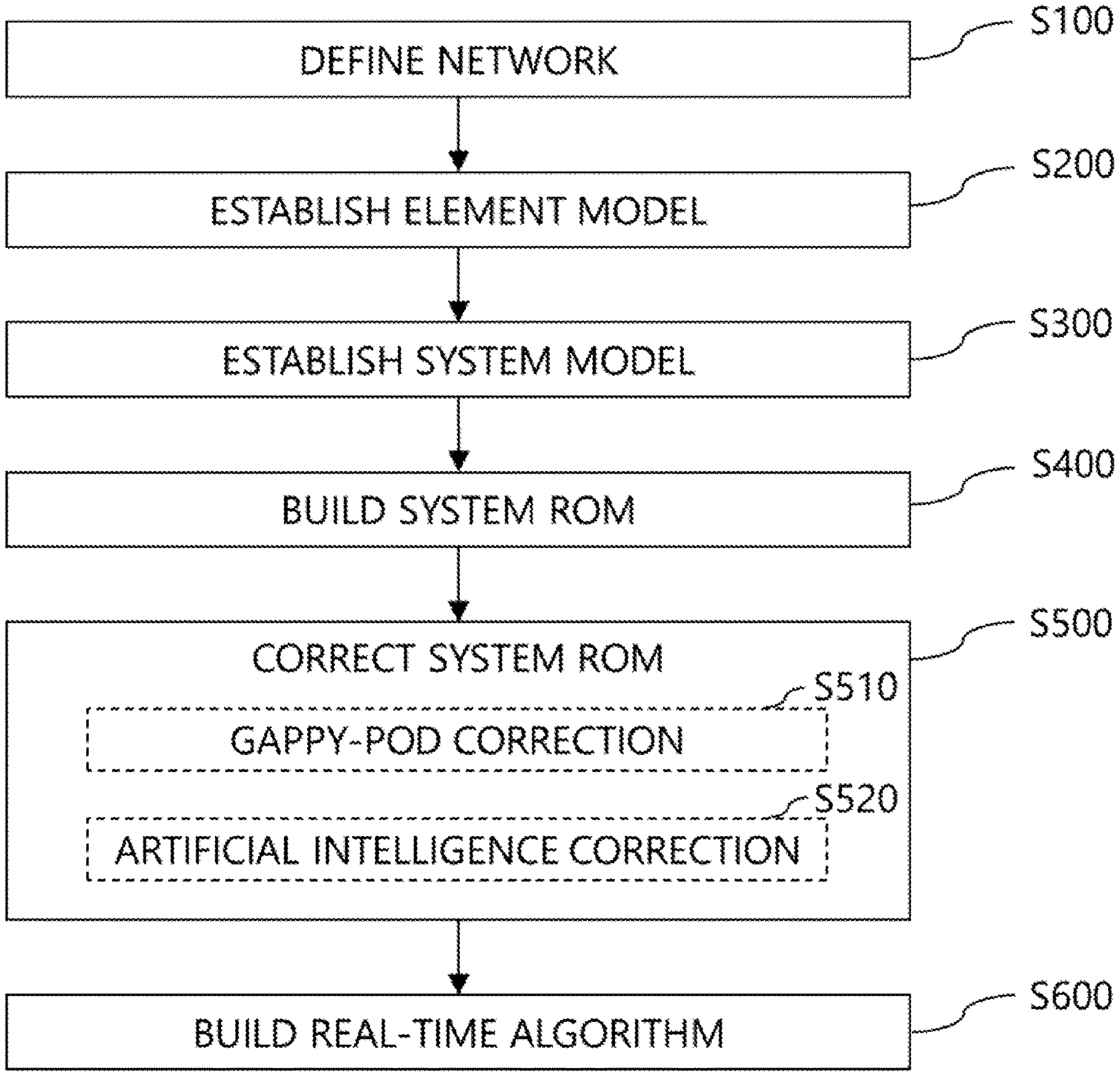
FIG. 1 is a flowchart sequentially illustrating the execution steps of a method for constructing a digital twin according to the present invention.

FIG. 1 is a flowchart sequentially illustrating the execution steps of a method for constructing a digital twin according to the present invention.

Referring to FIG. 1, the method for constructing a digital twin according to the present invention includes a network-defining step (S100), an element model establishing step (S200), a system model establishing step (S300), a system reduced order model (ROM) constructing step (S400), a system ROM correcting step (S500), and real-time algorithm constructing step (S600).

Each step of the present invention may be performed by a program in which the present invention is implemented on the computer, and measurement data may be obtained by various IoT sensors provided in the field.

Some terms used in the present invention are defined as follows.

Operating variable: Boundary conditions and operable variables that determine the overall state of an element facility or system, and all other variables that affect the current state.

Variables of interest: All variables that are of interest to facility operators among variables representing a state of the element facility or system (generally, measurement variables and performance variables are included among variables of interest).

Measurement variable: Variables that are measured online by various sensors for element facility or system.

Performance variables: Variables representing element facilities or key performance of a system (for example, efficiency, lifetime, energy consumption, safety, amount of harmful exhaust gas, etc.).

Figure 2:
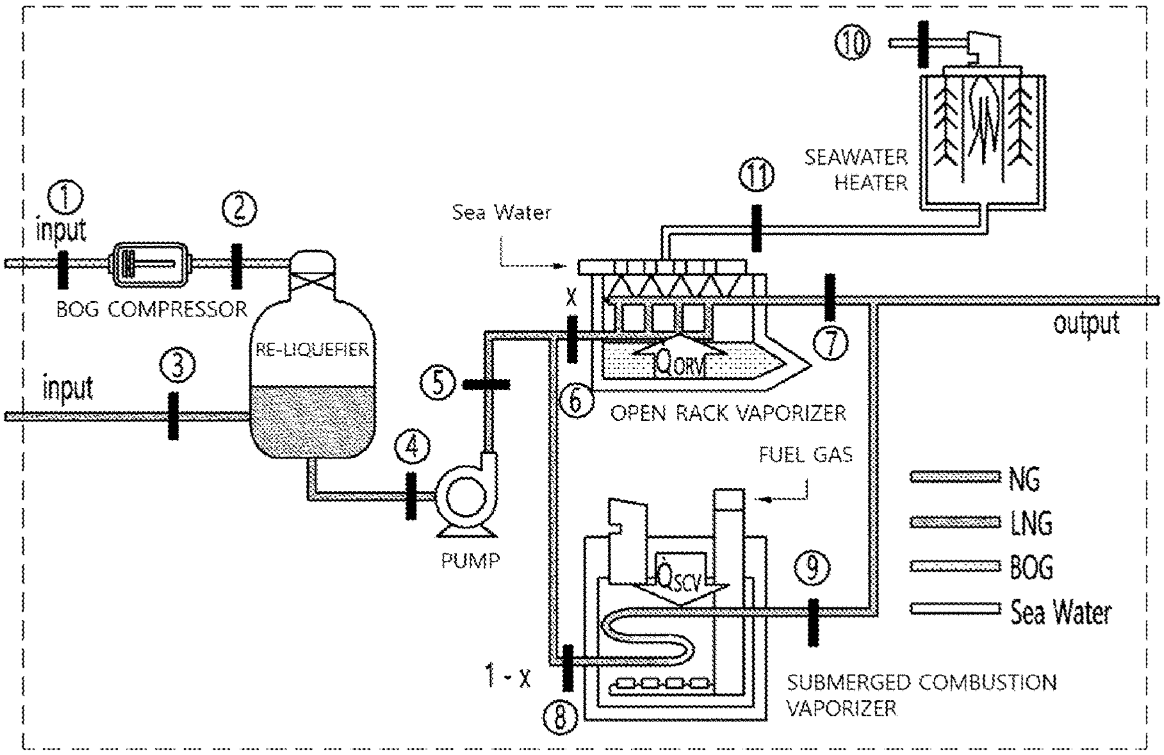
FIG. 2 is a diagram illustrating an example of a network defined for a city gas production process system according to the present invention.

The network-defining step (S100), which is the first step of the method for constructing a digital twin according to the present invention, is a step of defining the system as a network constituted by a combination of element facilities and connection media to construct a digital twin. FIG. 2 illustrates an example of a network defined for a city gas production process system. The city gas production process network illustrated in FIG. 2 involves converting liquefied natural gas (hereinafter referred to as 'NG') into gaseous NG with an open rack vaporizer that utilizes heat transfer from seawater and a submerged combustion vaporizer that utilizes combustion energy of fuel gas and supplying the gaseous NG. In this example, the amount of heat transferred to seawater, is expressed as $\dot{Q}_{ORV}$, energy supplied from a burner is expressed as $\dot{Q}_{scv}$ and a flow rate temperature, pressure, and enthalpy at each point are expressed as $\dot{m}$, T, P, and h, respectively.

In this example, for simplicity, inlet flow rates $\dot{m}_1$ and $\dot{m}_3$, a flow rate x to the open rack vaporizer, and a flow rate $\dot{m}_{10}$ and a temperature $T_{10}$ of seawater are defined as operating variables. All variables involved in the element model and performance variables, such as energy cost E for unit NG production, may be defined as variables of interest. Table 1 shows operating variables, variables of interest, measurement variables, and performance variables arbitrarily determined to illustrate the present invention.

TABLE 1

| | |
|---|---|
| Operating Variable | $\dot{m}_1$, $\dot{m}_3$, $\dot{m}_{10}$, $T_{10}$, x, |
| Variable of Interest | $P_2$, $h_2$, $P_4$, $h_4$, $P_5$, $h_5$, $\dot{Q}_{ORV}$, $h_{11}$, $h_7$, $h_9$ |
| Measurement Variable | $P_2$, $h_4$, $P_5$ |
| Performance Variable | E |

Next, the element model establishing step (S200) is a step of establishing a relational expression between major variables for each element facility.

Here, the relational expression represents a 0-D model that may determine the state of the facility according to the operating variable. When it is difficult to construct a model according to basic physical laws, a model based on machine learning, such as data regression and a neural network circuit, may be used, and a hybrid model that combines a physical model and a data-based model is also possible.

Next, the system model establishing step (S300) is a step of reflecting an additional relational expression by machine learning from a 3-D computer-aided engineering (3-D CAE) ROM or data for core element facilities to close all relational expressions for the system.

Figure 3:
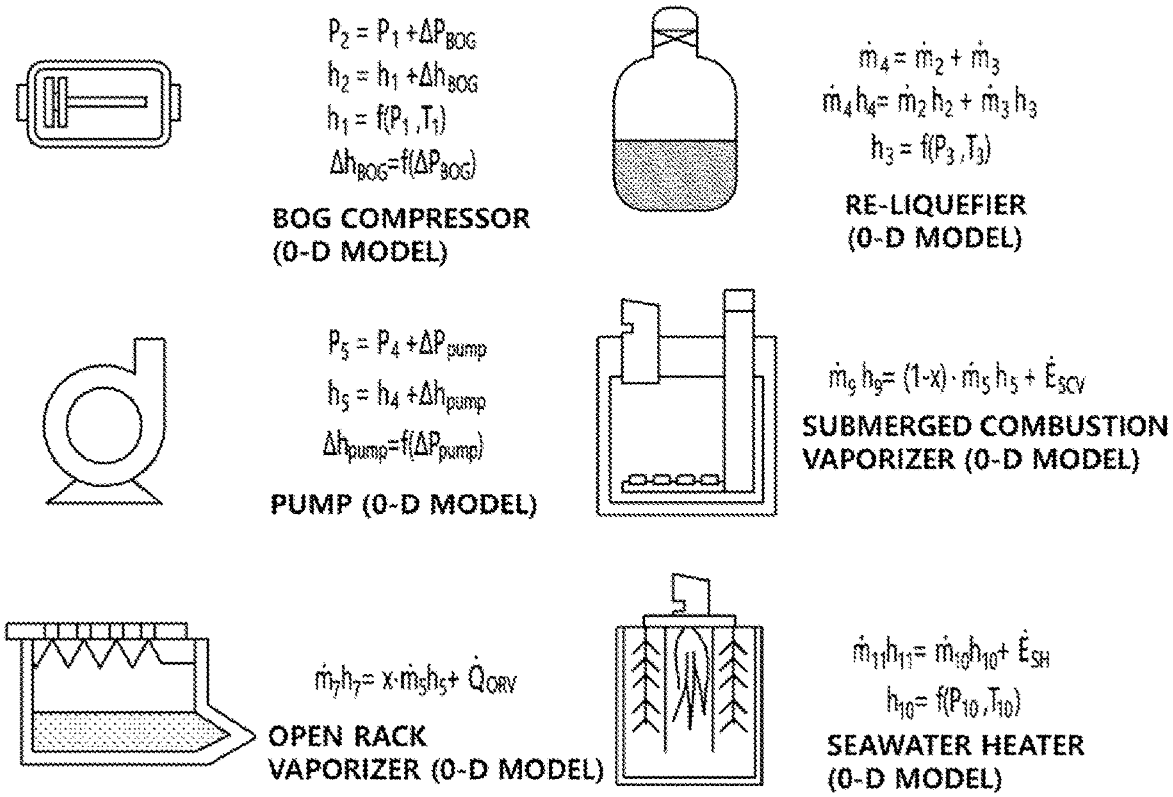
FIG. 3 is a diagram illustrating a 0-D model relational expression for each element facility constituting the network of FIG. 2.

FIG. 3 illustrates a 0-D model relational expression for each element facility constituting the network of FIG. 2, which is composed of operating variables and variables of interest. In FIG. 3, all relational expressions for the system are closed only when additional information on the amount of heat $\dot{Q}_{ORV}$ transferred to seawater of a seawater heater is given.

Figure 4:
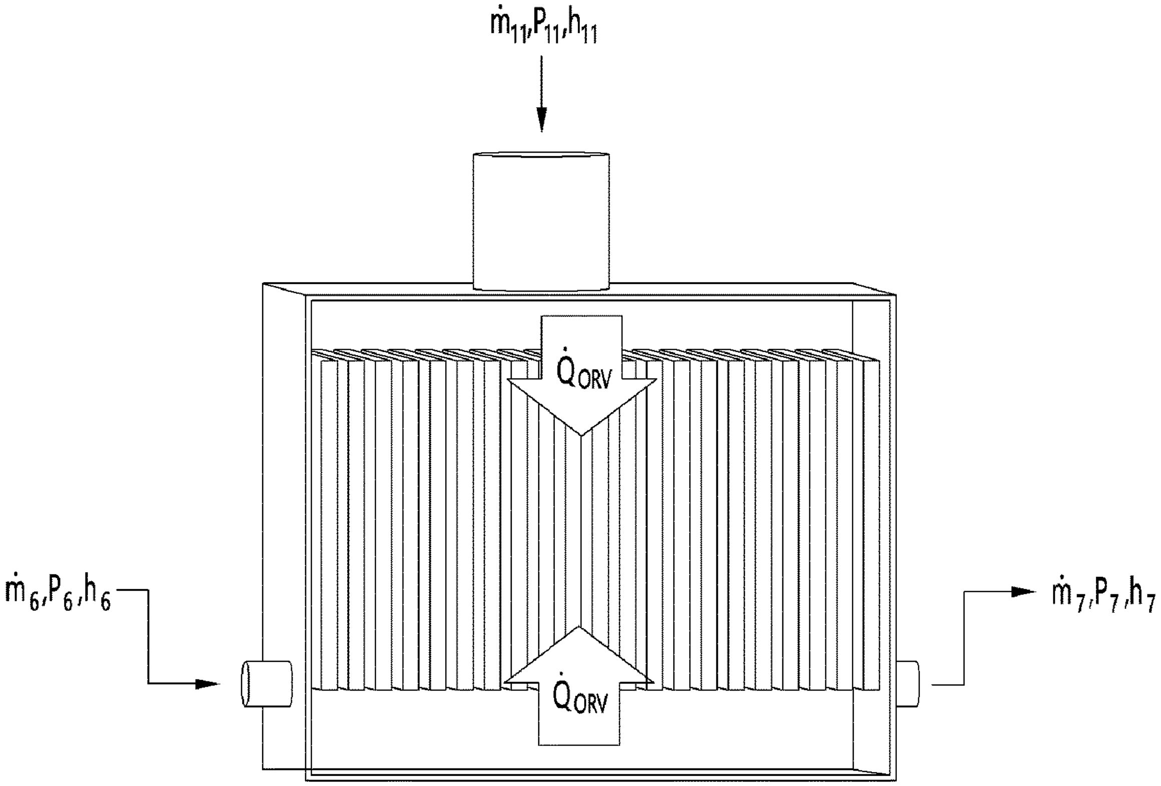
FIG. 4 is a diagram illustrating an open rack vaporizer as a key facility requiring 3-D CAE analysis.
Figure 5A:
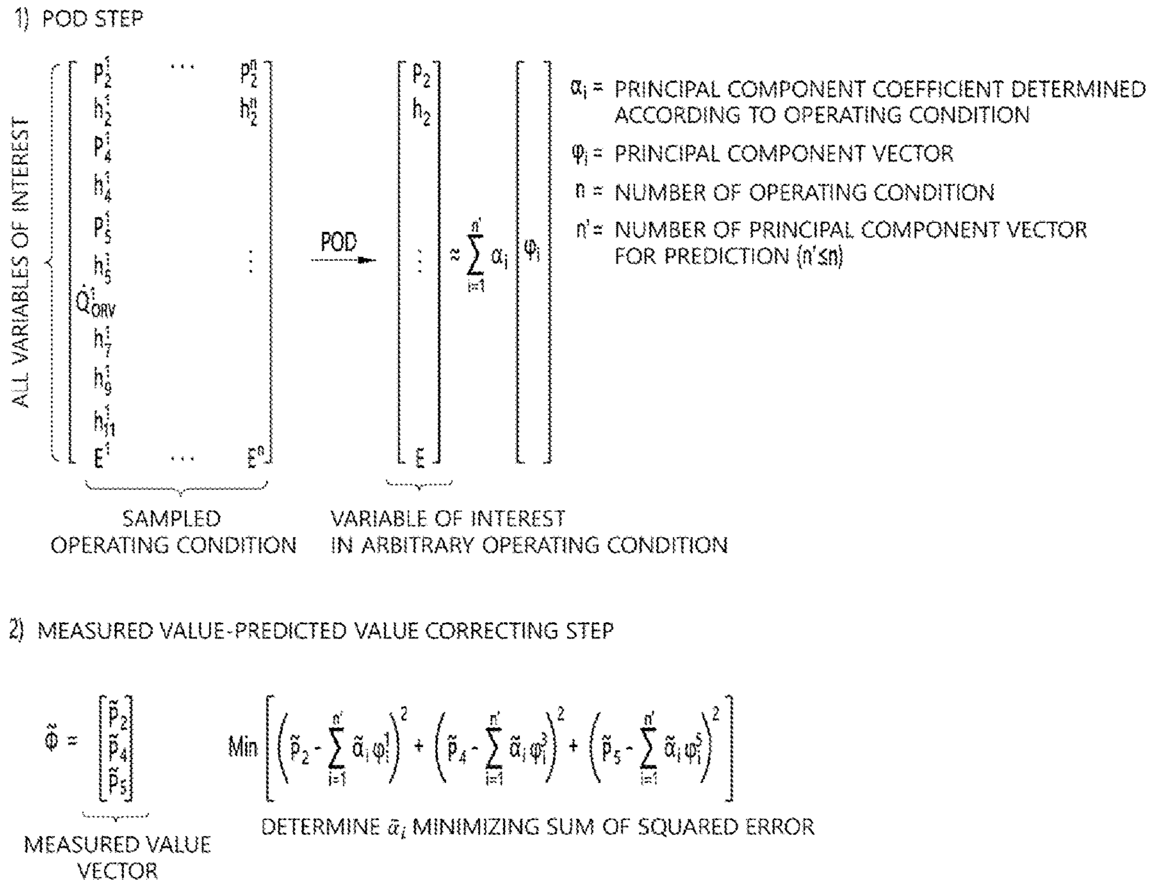
FIG. 5A illustrates a gappy-POD correcting step.
Figure 5B:
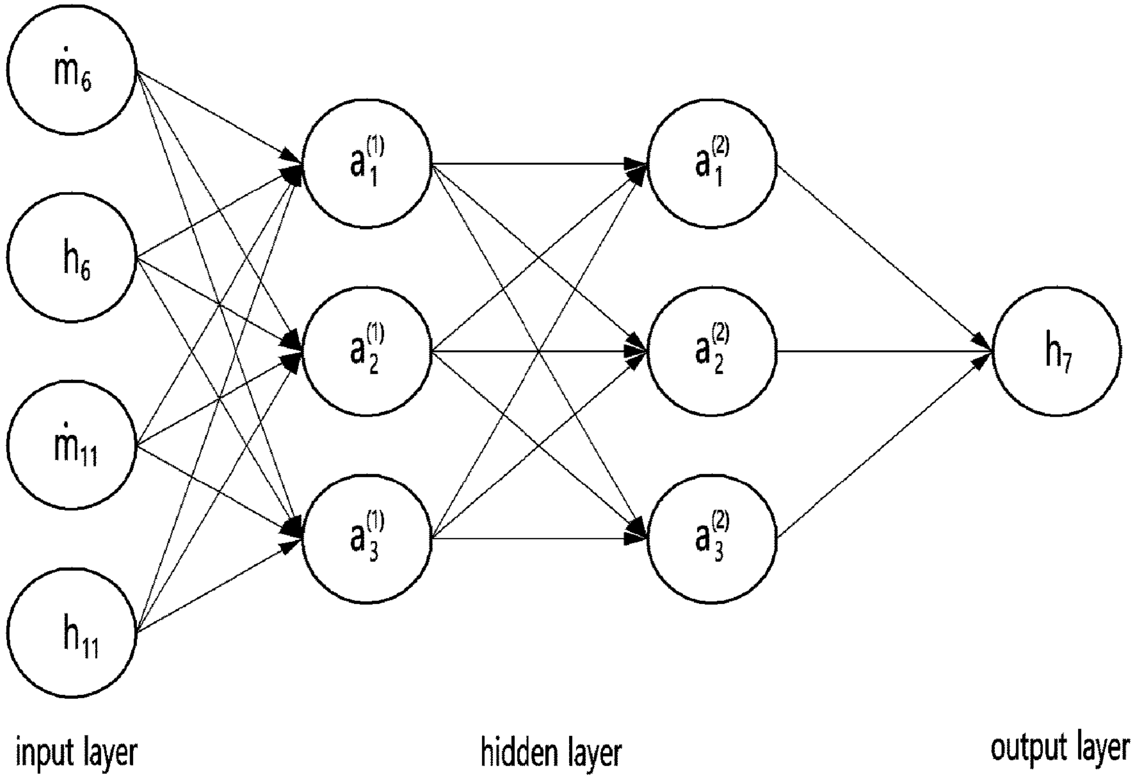
FIG. 5B illustrates a correction method according to an artificial intelligence correcting step.

When the CAE analysis of the open rack vaporizer illustrated in FIG. 4 is performed, a 3-D ROM composed of principal component vectors and coefficients illustrated in FIG. 5A is obtained by proper orthogonal decomposition (hereinafter referred to as "POD") of a matrix composed of variables of interest, such as multi-dimensional distribution or $\dot{Q}_{ORV}$ in the sampled operating conditions.

A new O-D relational expression required for closure from the data analysis result by a 3-D ROM or values of variables of interest, such as $\dot{Q}_{ORV}$ in arbitrary operating conditions, may be easily obtained.

According to an example, a BOG compressor, a re-liquefier, a pump, a submerged combustion vaporizer, a seawater heater, and an open rack vaporizer constructing a 0-D model linked to 3-D CAE analysis, which are facility elements constructed with a 0-D model, are connected in the same way as the city gas production process network illustrated in FIG. 2, thereby constructing the system model for the entire process.

Meanwhile, the process of directly obtaining a solution of the relational expression for all the element facilities from the system model generally requires excessive calculation time, making it difficult to respond in real time. To solve this problem, the present invention further includes a step (S400) of constructing a system ROM from calculation results for conditions sampled in the operating variable parameter space.

Accordingly, in the present invention, it is possible to obtain fast prediction results that enable real-time response by obtaining the solution for the operating condition sampled in the system operating variable space in advance and constructing the matrix composed of all the variables of interest to derive the system ROM for the system model established in the system model establishing step (S300) through the method such as POD analysis.

Next, the system ROM correcting step (S500) is a step of minimizing the error between the model predicted value and measurement data for the element facility and system and includes a gappy-POD correcting step (S510) and an artificial intelligence correcting step (S520).

The gappy-POD correcting step (S510) is a step of applying a gappy-POD method for driving a ROM from a matrix composed of all variables of interest obtained from conditions sampled in an operating variable parameter space and adjusting principal component coefficients of the ROM such that a sum of squared errors between a predicted value and a measured value is minimized (see FIG. 5A). As the gappy-POD method, the coupled gappy-POD method for adjusting principal component coefficients of the ROM by combining heterogeneous measured values may be applied (see "Patent Document 1").

The artificial intelligence correcting step (S520) is a step of correcting errors using artificial intelligence techniques such as machine learning by a neural network circuit based on the accumulated data when the causal relationship or function relationship between the error between the predicted value and the data, the operating variable and the predicted physical quantity is not clear.

In the system ROM correcting step (S500), the gappy-POD correcting step (S510) and the artificial intelligence correcting step (S520) may be performed independently or sequentially and simultaneously.

According to the present invention, in the system ROM correcting step (S500), an appropriate weight may be assigned to each error according to the uncertainty of the measured value or the importance of the main performance indicators while minimizing the error of the predicted value. In addition, in order to maintain the accuracy of the digital twin, the automatic correction that minimizes the error between online measured data and the model predicted value may be performed periodically or when a significant change in facility operation occurs.

Figure 6A:
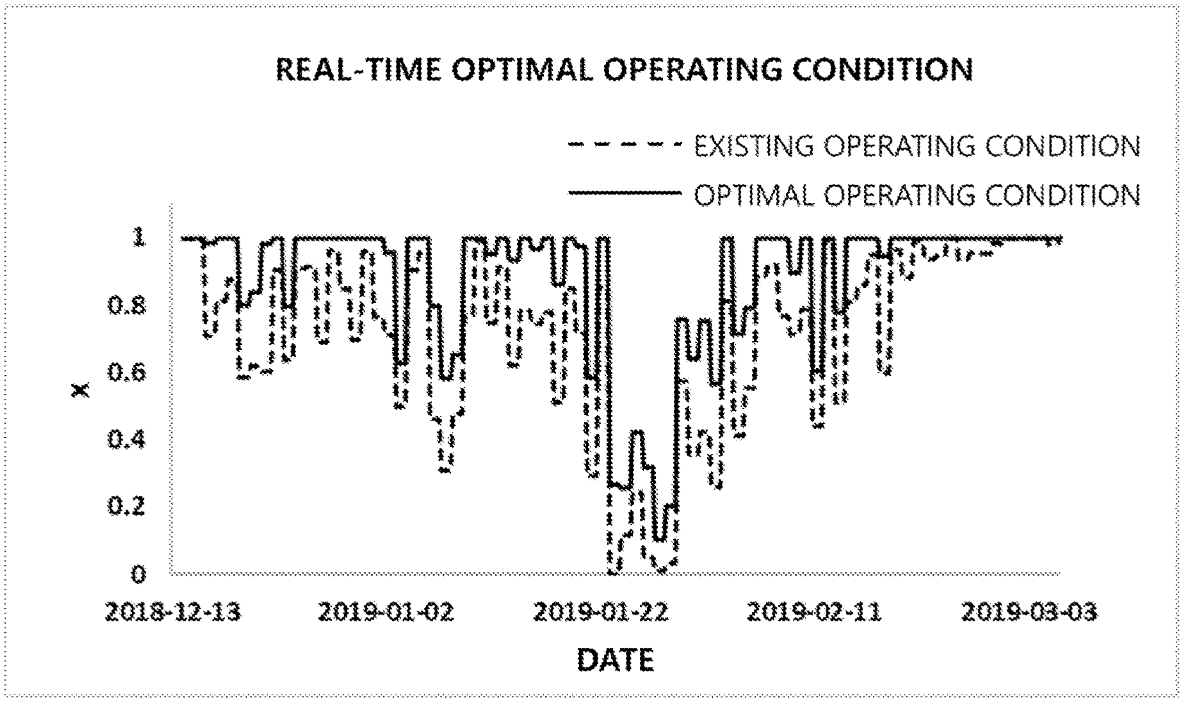
FIG. 6A illustrates an optimal operating case for operating variable x (flow rate to open rack vaporizer)
Figure 6B:
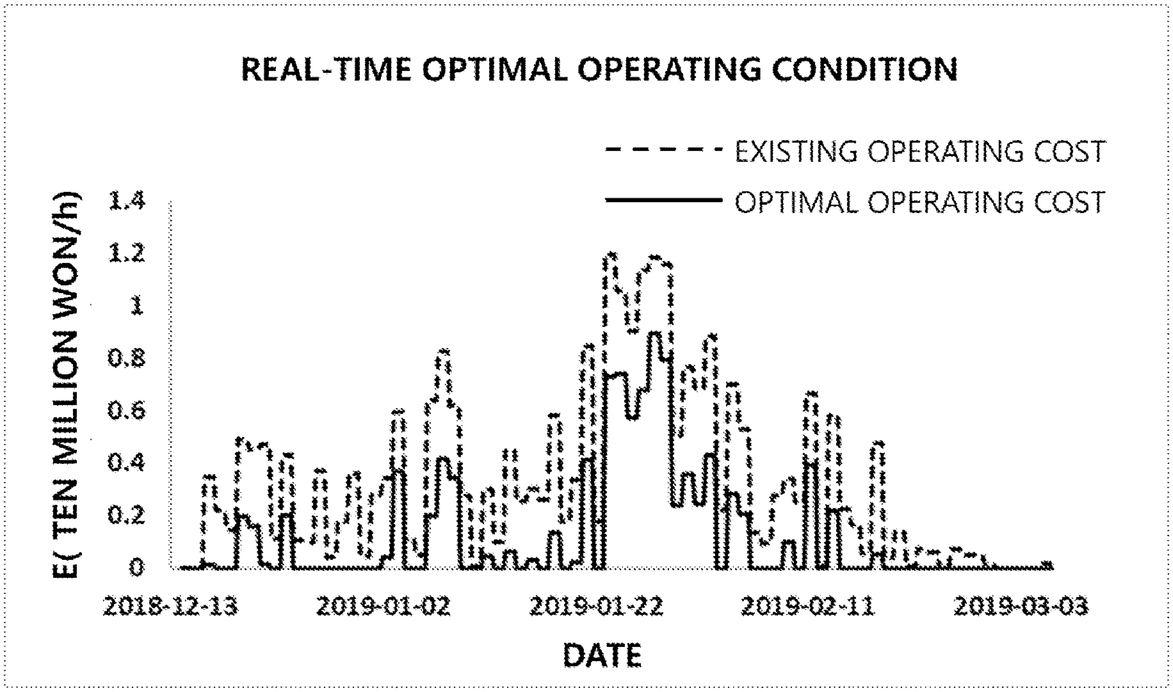
FIG. 6B illustrates an optimal operating case for performance variable E (energy cost for unit NG production).

Finally, the real-time algorithm constructing step (S600) is a step of constructing an algorithm for identifying the system state expected from the virtual operating condition or the optimal operating condition based on the real-time monitoring result and may include finding conditions that maximize or minimize predefined performance variables or cost functions in the operating variable parameter space based on the system ROM constructed in previous steps and presenting the conditions to operators in real time (see FIG. 6).

The embodiments disclosed in this specification and the accompanying drawings are only used for the purpose of easily explaining the technical spirit of the present invention and are not used to limit the scope of the present invention described in the claims. Therefore, it is to be understood by those skilled in the art that various modifications and other equivalent embodiments are possible.

The invention claimed is:

1. A method for constructing a digital twin, comprising:

a network-defining step of defining a multiphysical engineering system as a network constituted by a combination of element facilities;

an element model establishing step of establishing a relational expression-based 0-dimensional (0-D) model for each of the element facilities;

a system model establishing step of closing all relational expressions for a system by reflecting an additional relational expression by machine learning from a 3-dimensional computer-aided engineering reduced order model (3-D CAE ROM) or data for key element facilities in the 0-D models established in the element model establishing step;

a system ROM constructing step of constructing a system ROM for the system model established in the system model establishing step from calculation results for conditions sampled in an operating variable parameter space;

a system ROM correcting step of minimizing an error between a model predicted value and measured data for the element facility and the system; and a real-time algorithm constructing step of constructing an algorithm for identifying an expected system state or an optimal operating condition in a virtual operating condition based on the real-time monitoring result.

2. The method of claim 1, wherein the system ROM correcting step includes any one of:

a gappy-POD correcting step of applying a gappy-POD method for driving a ROM from a matrix composed of all variables of interest obtained from conditions sampled in an operating variable parameter space and adjusting principal component coefficients of the ROM so that a sum of squared errors between a predicted value and a measured value is minimized; and when a causal relationship or a functional relationship between an error between the predicted value and the data, an operating variable, and a predicted physical quantity is not clear, an artificial intelligence correcting step of correcting the error using artificial intelligence techniques of machine learning by a neural network circuit based on accumulated data.

3. The method of claim 2, wherein, as the gappy-POD method, the coupled gappy-POD method for adjusting principal component coefficients of the ROM by combining heterogeneous measured values is applied.

4. The method of claim 2, wherein the gappy-POD correcting step and the artificial intelligence correcting step are performed independently of each other or sequentially and simultaneously.

5. The method of claim 1, wherein, in the system ROM correcting step, an appropriate weight is assigned to each error according to uncertainty of a measured value or importance of main performance indicators while minimizing an error of a predicted value.

6. The method of claim 1, wherein, in the system ROM correcting step, in order to maintain accuracy of the digital twin, automatic correction that minimizes an error between online measured data and the model predicted value is performed periodically or when a significant change in facility operation occurs.

7. The method of claim 1, wherein, in the real-time algorithm constructing step, a condition maximizing or minimizing a predefined performance variable or cost function in an operating variable parameter space is found and presented to an operator in real-time.

* * * * *